(12) United States Patent
Ketsuka et al.

(10) Patent No.: US 11,283,948 B2
(45) Date of Patent: Mar. 22, 2022

(54) INFORMATION PROCESSING APPARATUS HAVING SECOND APPLICATION CREATABLE FROM FIRST APPLICATION

(71) Applicant: FUJIFILM BUSINESS INNOVATION CORP., Tokyo (JP)

(72) Inventors: Masakazu Ketsuka, Kanagawa (JP); Toru Takahashi, Kanagawa (JP); Takahiro Tojo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 94 days.

(21) Appl. No.: 16/372,599

(22) Filed: Apr. 2, 2019

(65) Prior Publication Data

US 2019/0312987 A1 Oct. 10, 2019

(30) Foreign Application Priority Data

Apr. 10, 2018 (JP) .............................. JP2018-075196
Apr. 27, 2018 (JP) .............................. JP2018-087008

(51) Int. Cl.
*G06F 9/00* (2006.01)
*G06F 9/445* (2018.01)
*G06F 21/10* (2013.01)
*H04N 1/00* (2006.01)
*G06F 21/62* (2013.01)

(52) U.S. Cl.
CPC ..... *H04N 1/00514* (2013.01); *G06F 9/44594* (2013.01); *G06F 21/629* (2013.01); *H04N 1/00411* (2013.01); *H04N 1/00474* (2013.01)

(58) Field of Classification Search
USPC ....... 358/1.1–3.29, 1.11–1.18; 707/633–638, 707/662–664, 687–692; 706/59; 713/156–158, 175–178
See application file for complete search history.

(56) References Cited

U.S. PATENT DOCUMENTS

| | | | | |
|---|---|---|---|---|
| 2008/0082955 A1* | 4/2008 | Andreessen | .......... | G06F 16/958 717/100 |
| 2010/0296122 A1* | 11/2010 | Mitsui | .................. | G06F 3/1204 358/1.15 |
| 2012/0041844 A1* | 2/2012 | Shen | ...................... | G06Q 30/06 705/26.61 |
| 2014/0047413 A1* | 2/2014 | Sheive | ...................... | G06F 8/30 717/110 |
| 2015/0294105 A1* | 10/2015 | Baricuatro, Jr. | ..... | G06F 21/6245 726/17 |
| 2016/0078068 A1* | 3/2016 | Agrawal | ............... | G06F 16/215 707/692 |

FOREIGN PATENT DOCUMENTS

JP 2008-158816 A 7/2008

* cited by examiner

*Primary Examiner* — Marcellus J Augustin
(74) *Attorney, Agent, or Firm* — Oliff PLC

(57) ABSTRACT

An information processing apparatus includes: a creating unit that creates, from a first application deletable by a person with a first authority, a second application deletable by a person with a second authority; and a deleting unit that deletes the second application according to a predetermined condition when the first application is deleted.

23 Claims, 19 Drawing Sheets

FIG. 4A

215A PRIVATE APP MANAGEMENT TABLE (FOR MR. A)

| MANAGEMENT ID | APP NAME | PRIVATE UID | PUBLIC UID |
|---|---|---|---|
| 1 | COPY IN BLACK/WHITE | AAA1 | — |
| 2 | TWO COPIES | AAA2 | PPP1 |

FIG. 4B

215B PRIVATE APP MANAGEMENT TABLE (FOR MR. B)

| MANAGEMENT ID | APP NAME | PRIVATE UID | PUBLIC UID |
|---|---|---|---|
| 1 | SEND TO MR. A | BBB1 | — |
| 2 | SEND TO MR. C IN COLOR | BBB2 | PPP2 |

FIG. 5A

216A SCREEN MANAGEMENT TABLE (FOR MR. A)

| MANAGEMENT ID | APP NAME | PRIVATE UID | PUBLIC UID | CONTROL ID |
|---|---|---|---|---|
| 1 | COPY IN BLACK/WHIT | AAA1 | — | CON4 |
| 2 | TWO COPIES | AAA2 | PPP1 | [CON1] |
| 3 | SEND TO MR. C | — | PPP2 | — |

FIG. 5B

216B SCREEN MANAGEMENT TABLE (FOR MR. B)

| MANAGEMENT ID | APP NAME | PRIVATE UID | PUBLIC UID | CONTROL ID |
|---|---|---|---|---|
| 1 | SEND TO MR. A | BBB1 | — | CON3 |
| 2 | TWO COPIES | — | PPP1 | — |
| 3 | SEND TO MR. C IN COLOR | BBB2 | PPP2 | CON3 |

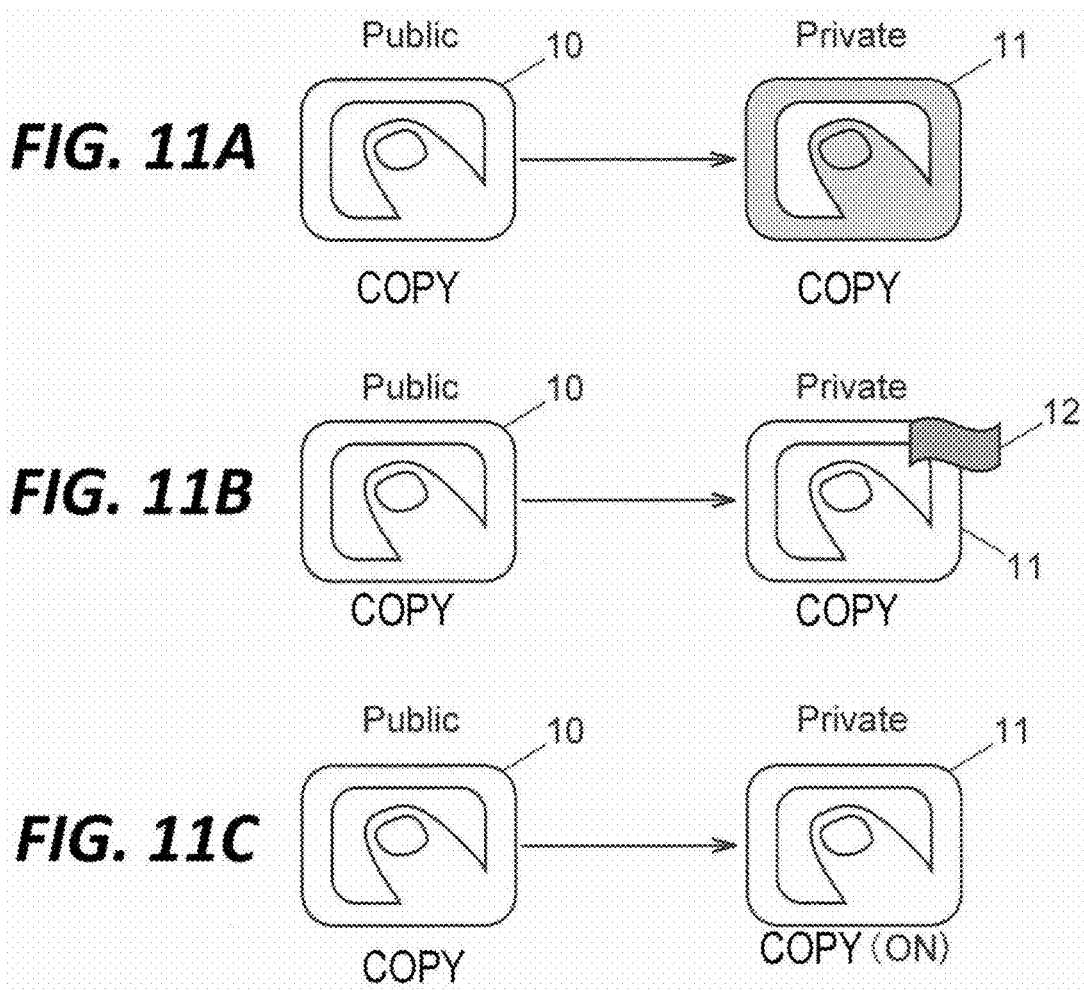

FIG. 12A

213a APP USE CONTROL TABLE

| CONTROL ID | USAGE CONDITION | REGIS-TRANT |
|---|---|---|
| CON10 | AVAILABLE IF REGISTERED IN PERMISSION TABLE | z |
| CON11 | AVAILABLE FOR MR. A, MR. B | z |

FIG. 12B

213b PERMISSION TABLE

| MANAGEMENT ID | PERMITTED USER |
|---|---|
| 1 | MR. Z |
| 2 | MR. B |

FIG.13

213c APP USE CONTROL TABLE

| CONTROL ID | USAGE CONDITION | REGIS-TRANT |
|---|---|---|
| CON20 | USE WHILE STORED IN PUBLIC APP STORAGE, AND WARN EACH USER ABOUT "DELETED" | Z |
| CON21 | USE WHILE STORED IN PUBLIC APP STORAGE, AND DISPLAY "CONTINUE TO USE?" TO ALLOW EACH USER TO SELECT CONTINUED USE | Z |

FIG.14A

| MANAGEMENT ID | APP NAME | UID | PUBLIC UID | CONTROL ID |
|---|---|---|---|---|
| 3 | SEND TO MR. C IN COLOR | BBB2 | PPP2 | CON3 |

| MANAGEMENT ID | APP NAME | UID | PUBLI-SHER | CONTROL ID |
|---|---|---|---|---|
| 1 | TWO COPIES | PPP1 | Z | — |
| 2 | SEND TO MR. C | PPP2 | Z | [CON2],CON5 |
| 3 | SEND TO MR. C IN COLOR | PPP3 | B | XXX |

| MANAGEMENT ID | APP NAME | UID | PUBLIC UID | PUBLI-SHER | CONTROL ID |
|---|---|---|---|---|---|
| 1 | TWO COPIES | PPP1 | | Z | — |
| 2 | SEND TO MR. C | PPP2 | | Z | [CON2],CON5 |
| 3 | SEND TO MR. C IN COLOR | PPP3 | PPP2 | B | CON3 |

| MANAGEMENT ID | APP NAME | UID | PUBLIC UID | PUBLI-SHER | CONTROL ID |
|---|---|---|---|---|---|
| 1 | TWO COPIES | PPP1 | | Z | — |
| 2 | SEND TO MR. C | PPP2 | | Z | [CON2],CON5 |
| 3 | SEND TO MR. C IN COLOR | PPP3 | PPP2 | B | CON3 |
| 4 | SEND TWO COPIES IN COLOR TO MR. C | PPP4 | PPP2,PPP3 | B | CON3 |

214

FIG.16A 51a SETTING INFORMATION OF PUBLIC APP

| SETTING ITEM | SETTING VALUE | TYPE |
|---|---|---|
| A | a1 | UNCHANGEABLE |
| B | b1 | SUSTAINABLY CHANGEABLE |
| C | c1 | CHANGEABLE |
| ⋮ | ⋮ | ⋮ |

FIG.16B 51a

| SETTING ITEM | SETTING VALUE | TYPE |
|---|---|---|
| A | a2 | UNCHANGEABLE |
| B | b2 | SUSTAINABLY CHANGEABLE |
| C | c2 | CHANGEABLE |
| ⋮ | ⋮ | ⋮ |

FIG.16C 52a SETTING INFORMATION OF PRIVATE APP

| SETTING ITEM | SETTING VALUE | TYPE | SCHEDULED CHANGED VALUE |
|---|---|---|---|
| A | a1 | UNCHANGEABLE | a2 |
| B | b1 | SUSTAINABLY CHANGEABLE | b2 |
| C | c1 | CHANGEABLE | — |
| ⋮ | ⋮ | ⋮ | ⋮ |

INFORMATION PROCESSING APPARATUS HAVING SECOND APPLICATION CREATABLE FROM FIRST APPLICATION

CROSS-REFERENCE TO RELATED APPLICATIONS

This application is based on and claims priority under 35 USC 119 from Japanese Patent Application No. 2018-087008 filed Apr. 27, 2018 and Japanese Patent Application No. 2018-075196 filed Apr. 10, 2018.

BACKGROUND

(i) Technical Field

The present disclosure relates to an information processing apparatus.

(ii) Related Art

There has recently been proposed an information processing system in which data managed in a public DB may be customized and used by using a private DB (see, e.g., JP-A-2008-158816).

The information processing system disclosed in JP-A-2008-158816 includes: a public DB for which a data rewriting by a general user is restricted, and, for example, a data update is performed by an administrator; a private DB for which data rewriting is allowed for the general user; and a DB interface that performs various processings on the public DB and the private DB based on a request from the administrator or the general user. When the administrator requests the DB interface to delete data on the public DB, data of the private DB corresponding to DB association information on the private DB is deleted.

SUMMARY

Aspects of non-limiting embodiments of the present disclosure relate to providing an information processing apparatus that makes it possible to delete a second application according to the intention of a person with a specific authority when the second application is created for use by a person other than the person with the specific authority from a first application published by the person with the specific authority.

Aspects of non-limiting embodiments of the present disclosure also relate to providing an information processing apparatus that makes it possible to limit, for each item, change of setting values of a second application by users when a first application available for plural users, in which setting values of setting items are registered, is copied to create the second application in such a manner that it is available only for the users.

According to an aspect of the present disclosure, there is provided an information processing apparatus including: a creating unit that creates a second application that can be deleted by a person with a second authority, from a first application that can be deleted by a person with a first authority; and a deleting unit that deletes the second application according to a predetermined condition when the first application is deleted.

BRIEF DESCRIPTION OF THE DRAWINGS

Exemplary embodiments of the present disclosure will be described in detail based on the following figures, wherein:

FIG. 4A is a view illustrating an example of a private app management table for Mr. A, and FIG. 4B is a view illustrating an example of a private app management table for Mr. B;

FIG. 5A is a view illustrating an example of a screen management table for Mr. A, and FIG. 5B is a view illustrating an example of a screen management table for Mr. B;

FIGS. 11A to 11C are views illustrating an example of an icon in a first modification;

FIGS. 12A and 12B illustrate another example of the app use control table in a second modification, in which FIG. 12A is a view illustrating an example of the app use control table, and FIG. 12B is a view illustrating an example of a permission table;

FIG. 13 is a view illustrating another example of the app use control table in a third modification;

FIGS. 14A to 14D are views for explaining another example of the public app management table in a fourth modification;

FIGS. 16A to 16C are views for explaining setting information held in applications, in which FIG. 16A is a view illustrating an example of setting information before setting values of a public app are changed, FIG. 16B is a view illustrating an example of setting information after the setting values of the public app are changed, and FIG. 16C is a view illustrating an example of setting information of the private app;

DETAILED DESCRIPTION

Figure 1:
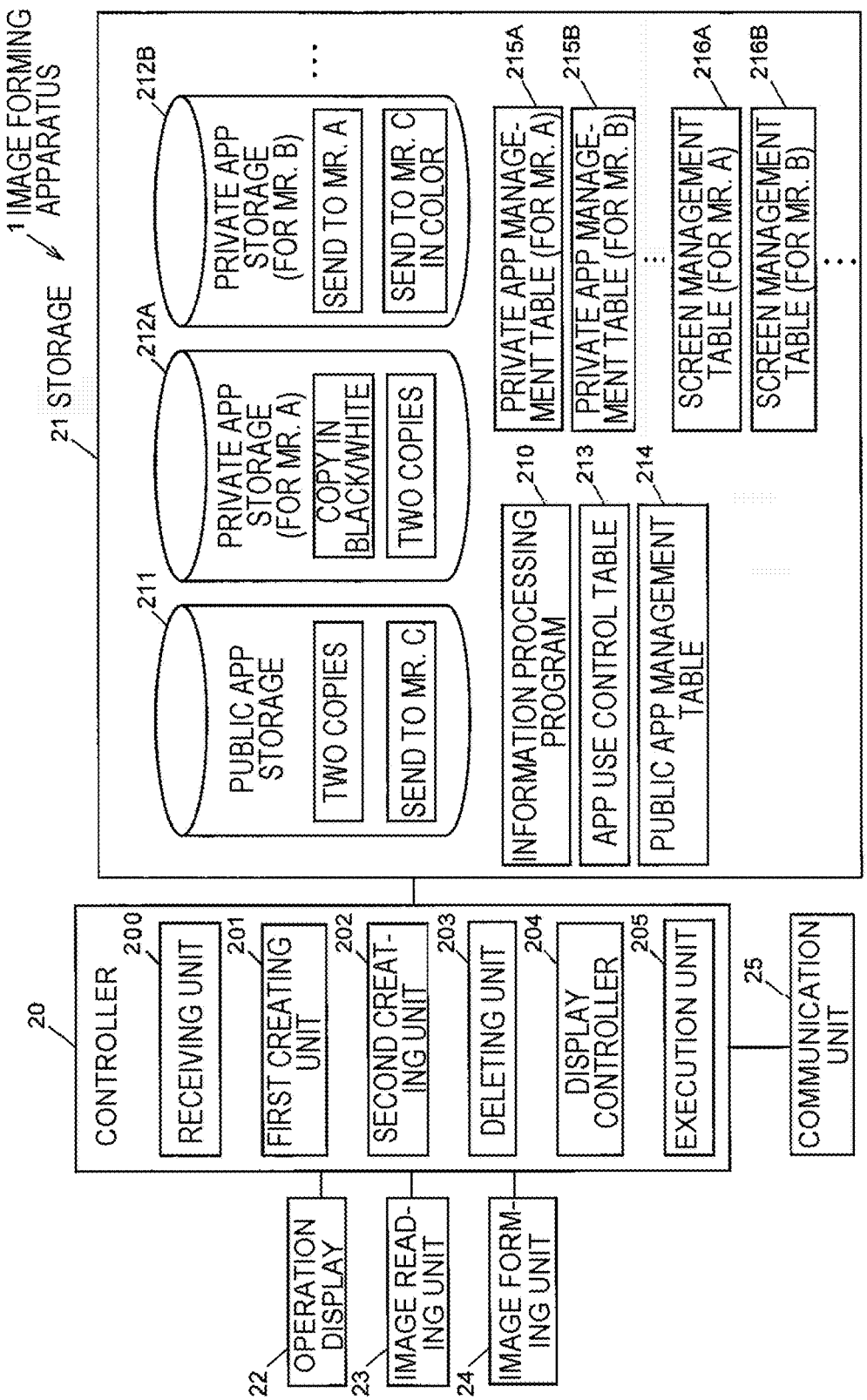
FIG. 1 is a block diagram illustrating an example of a control system of an image forming apparatus according to an exemplary embodiment of the present disclosure.

Hereinafter, exemplary embodiments of the present disclosure will be described with reference to the accompanying drawings. In the respective drawings, constituent elements having substantially the same functions will be denoted by the same reference numerals, and overlapping explanations thereof will be omitted.

Summary of Exemplary Embodiment

An information processing apparatus according to an exemplary embodiment of the present disclosure includes: a creating unit that creates, from a first application deletable by a person with a first authority, a second application deletable by a person with a second authority; and a deleting unit that deletes the second application according to a predetermined condition when the first application is deleted.

The "person with the first authority" is, for example, an administrator who manages a corresponding information processing apparatus or a system including the corresponding information processing apparatus. The "person with the second authority" is, for example, a user other than the administrator.

The first application and the second application execute processings specified according to setting values of registered setting items. As the first application and the second application, for example, some applications are immediately executed without displaying of a screen for confirming setting values, and other applications are executed after a screen for confirming setting values is displayed and confirmed.

The information processing apparatus may be, for example, an image forming apparatus such as a multifunction machine or a facsimile device, a multifunctional mobile phone (smart phone), a personal computer (PC), or a tablet terminal.

Exemplary Embodiment

FIG. 1 is a block diagram illustrating an example of a control system of an image forming apparatus according to an exemplary embodiment of the present disclosure; The image forming apparatus 1 is a multifunction machine having plural functions such as, for example, scanning, printing, copying, e-mailing, or facsimiling. The image forming apparatus 1 includes a controller 20, a storage 21, an operation display 22, an image reading unit 23, an image forming unit 24, and a communication unit 25. The multifunction machine is an example of an information processing apparatus.

The controller 20 is constituted by, for example, a central processing unit (CPU) and an interface. The CPU operates in accordance with an information processing program 210 to function as a receiving unit 200, a first creating unit 201, a second creating unit 202, a deleting unit 203, a display controller 204, or an execution unit 205 or the like. Details of each of the units 200 to 205 will be described herein below.

The storage 21 is constituted by, for example, a read only memory (ROM), a random access memory (RAM), and a hard disk, and stores various types of information including the information processing program 210, a public app storage 211, private app storages 212A, 212B, . . . (hereinafter, these may also be collectively referred to as "private app storage 212") provided for each user, an app use control table 213, a public app management table 214, private app management tables 215A, 215B, . . . (hereinafter, these may also be collectively referred to as "private app management table 215") provided for each user, and screen management tables 216A, 216B, . . . (hereinafter, these may also be collectively referred to as "screen management table 216") provided for each user. The present specification uses "record" or "register" in a case where information is recorded to a table, and uses "store" in a case where information is recorded to a storage. Here, the user is an example of a user excluding an administrator. When both the administrator and the user are included, the administrator and the user are also called operators. The administrator is an example of a person with a first authority. The user is an example of a person with a second authority. The private app storage 212 is an example of a storage area.

The public app storage 211 stores a public application (hereinafter, also simply referred to as a "public app"). FIG. 1 illustrates a state where the public app storage 211 stores public apps having, for example, app names of "two copies" and "send to Mr. C." The public application is an example of a first application.

Here, the app name "two copies" indicates an application by which two copies of a document with one or more pages are made. The app name "send to Mr. C" indicates an application by which an image is sent to a user terminal device of Mr. C via an e-mail.

The private app storage 212 stores a private application (hereinafter, also simply referred to as a "private app"). FIG. 1 illustrates a state where the private app storage 212A for Mr. A stores private apps having, for example, app names of "copy in black/white" and "two copies." Also, FIG. 1 illustrates a state where the private app storage 212B for Mr. B stores private apps having, for example, app names of "send to Mr. A" and "send to Mr. C in color." Hereinafter, the public app and the private app may be collectively and simply referred to as "apps." The private application is an example of a second application.

Here, the app name "copy in black/white" indicates an application by which an image read from a document is copied with a black-white image. The app name "send to Mr. A" indicates an application by which an image is sent to a user terminal device of Mr. A via an e-mail. The app name "send to Mr. C in color" indicates an application by which a color image is sent to a user terminal device of Mr. C via an e-mail.

The public app management table 214 is used for managing a public app. The private app management table 215 is used for managing a private app for each user. The screen management table 216 is used for managing a screen operated by a user, for each user.

In FIG. 1, it is assumed that the private app storage 212A, the private app management table 215A, and the screen management table 216A are prepared for Mr. A as a user, and the private app storage 212B, the private app management table 215B, and the screen management table 216B are prepared for Mr. B as a user.

The "public application" is an application published by an administrator, and only the administrator has an authority to perform creation and deletion. The private application is an application created for each user. The "private application" is an application obtained by duplicating the public application by an administrator or a user, which is not open to others than the corresponding user. Only the corresponding user has an authority to delete the private application. In the present specification, "copy" indicates that the private application is created while setting values held in the public application are kept as they are.

As for the public application and the private application, for example, some applications may be immediately executed without displaying of a screen for confirming setting values, and other applications may be executed after a screen for confirming setting values is displayed and confirmed.

The operation display 22 has a touch panel display having a touch panel superimposed on a display portion such as a liquid crystal display, which displays a screen such as a menu screen on the display portion, and accepts an operation from an operator to the touch panel. On the menu screen, an icon including an app name is displayed. When the icon is selected, the corresponding application is activated. The icon is one that indicates a function of a processing to be executed by an application, on a display screen through, for example, pictures, pictograms, or letters, so as to instruct the processing to be executed. The icon is an example of an instruction unit.

The image reading unit 23 includes an automatic document feeder provided on a document table, and a scanner that reads image data from a document placed on the document table, or a document fed by the automatic document feeder. The image reading unit 23 stores the read image data in the storage 21.

The image forming unit 24 forms a black-white image or a color image on a recording medium such as a sheet through, for example, an electrophotographic system or an inkjet method.

The communication unit 25 transmits and receives information to/from an external device such as an administrator terminal device used by an administrator and a user terminal device used by a user via a network by, for example, an e-mail or a facsimile. The network is a communication network such as a local network (LAN), the Internet, or a public network, which transmits and receives data through, for example, a wired communication, a wireless communication or the like.

Configuration of App Use Control Table

Figure 2:
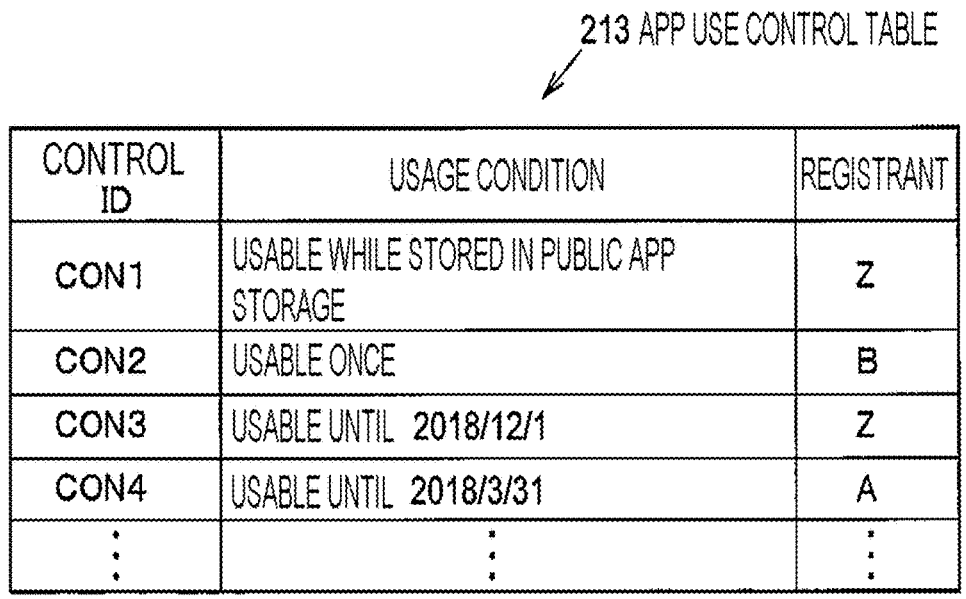
FIG. 2 is a view illustrating an example of an app use control table.

FIG. 2 is a view illustrating an example of the app use control table 213. The app use control table 213 is used when an administrator or a user registers a usage condition of a public app or a private app. The app use control table 213 includes items, such as, a "control ID" in which a control ID that identifies an app usage control is registered, a "usage condition" in which a usage condition of the app usage control is registered, and a "registrant" in which a registrant name is registered. Here, the app usage control indicates a processing that grants a usage condition of an app within the public app storage 211 and the private app storage 212. In the item of the "registrant" of FIG. 2, it is assumed that Z indicates an administrator name, and others, that is, A and B, indicate user names.

A usage condition of a control ID "CON1" indicates that a control is performed such that during a period when a public app is stored in the public app storage 211, a corresponding private app stored in the private app storage 212 may be used, and when the public app is deleted from the public app storage 211, the corresponding private app is deleted from the private app storage 212. The private app corresponding to the public app is an app obtained by duplicating the public app. In general, app names are the same, but a part of setting values may be changed, and then, an app with a changed app name may be included.

A usage condition of a control ID "CON2" allows a private app to be usable a designated number of times, which indicates a processing in which a user may use the private app the designated number of times, and the private app is deleted after the designated number of times. The corresponding drawing indicates an example in which "usable once" is registered in the usage condition of "CON2."

Usage conditions of control IDs "CON3" and "CON4" allow a private app to be usable for a designated period, which indicates a processing in which a user may use the private app during the designated period, and the private app is deleted after the designated period. The corresponding drawing indicates an example in which "usable until 2018/12/1" is registered in the usage condition of "CON3," and "usable until 2019/3/31" is registered in the usage condition of "CON4."

Although not described in FIG. 2, as a usage condition of a control ID "CONx," any number of optional contents may be registered. A private app with nothing registered in a "control ID" of the public app management table 214 and the private app management table 215 to be described below is excluded from control targets. That is, even when a public app is deleted from the public app storage 211, a copied private app remains without disappearing from the private app storage 212.

Among the app usage controls, some controls may be used in combination and others may not be used in combination. For example, "number of times" and "period" may be used in combination at the same time. At a time point when either one is reached first, deletion is performed. A control target may not be limited to a public app. That is, the control ID may be set for not only a public app but also a private app. For example, when the registrant of the "CON2" is Mr. B, and the control ID "CON2" is set for a private app for Mr. B, only Mr. B is affected during a period when the private app is stored in the private app storage 212B for Mr. B. Mr. B may also copy (publish) the private app stored in the private app storage 212B, in the public app storage 211.

A private app may be deleted from the screen management table 216 of a user. Otherwise, the private app may exist on the screen management table 216, but an icon on a screen may be hidden (including a grey out). Although a display of an icon remains, a processing may not be performed even when the icon is operated (a notification such as a beep sound may be made).

The app usage control function may be turned to an invalid state (locked state). For example, when the usage condition is "use once," an unlocked state may be made from the beginning. This is to perform counting in a situation "used 0 times" at a time point of copy so that after a copied app is used "once," the app usage control will be executed. Adversely, a locked state is made when a trial period is set to a certain extent. During the trial period, the copied app may be used many times. Then, when a time "usable only once afterwards" comes, an unlocked state is made. At this time point, counting of the number of times of use is started. In many "numbers of times" or "periods," the usage would be made in an unlocked state.

Configuration of Public App Management Table

Figure 3:
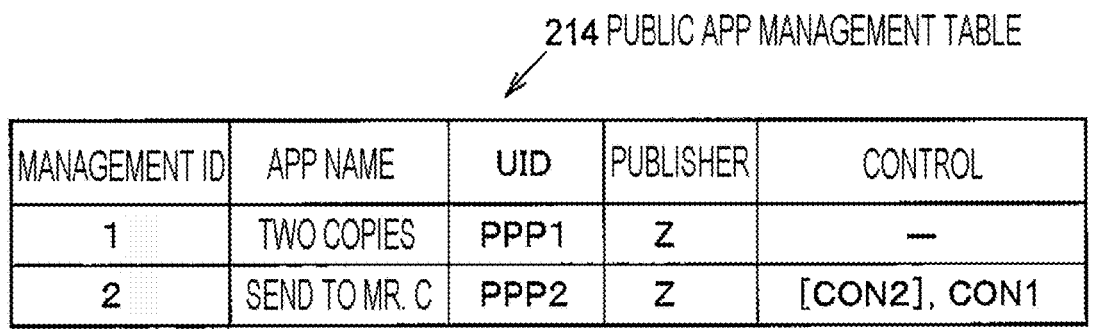
FIG. 3 is a view illustrating an example of a public app management table.

FIG. 3 is a view illustrating an example of the public app management table 214. The public app management table 214 includes items such as a "management ID" that indicates a management number in the corresponding table 214, an "app name" in which an application name is registered, a "UID" in which a unique identifier (UID) that uniquely identifies an application in the image forming apparatus 1 is registered, a "publisher" in which a person who has published the application is registered, and a "control ID" in which the control ID of FIG. 2 is registered. The [xxx] in the item of the "control ID" indicates a locked state. The [CON2] described in FIG. 3 indicates that CON2 is placed in a locked state. It is assumed that, in the "app name" described in FIG. 3, for example, "two copies" and "send to Mr. C" are registered.

Configuration of Private App Management Table

FIG. 4A is a view illustrating an example of the private app management table 215A for Mr. A. The private app management table 215A includes items such as a "management ID" that indicates a management number in the corresponding table 215A, an "app name" in which an application name is registered, a "private UID" in which a private UID that uniquely identifies a private application in the private app storage 212A is registered, and a "public UID" in which a UID that uniquely identifies an application in the image forming apparatus 1 is registered. It is assumed that in the "app name" described in FIG. 4A, for example, "copy in black/white" and "two copies" are registered.

FIG. 4B is a view illustrating an example of the private app management table 215B for Mr. B. Similarly to the private app management table 215A for Mr. A. The private app management table 215B includes items such as a "management ID," an "app name," a "private UID," and a "public UID." It is assumed that in the "app name" described in FIG. 4B, for example, "send to Mr. A" and "send to Mr. C in color" are registered.

Configuration of Screen Management Table

FIG. 5A is a view illustrating an example of the screen management table 216A for Mr. A. The screen management table 216A is used for managing a screen displayed on the operation display 22 when Mr. A logs in. The screen management table 216A includes items such as a "management ID" that indicates a management number in the corresponding table 216A, an "app name" in which an application name is registered, a "private UID" in which a private UID that uniquely identifies a private application in the private app storage 212A is registered, a "public UID" in which a UID for uniquely identifying an application in the image forming apparatus 1 is registered, and a "control ID" described in FIG. 2. It is assumed that in the "app name" described in FIG. 5A, for example, "copy in black/white," "two copies," and "send to Mr. C" are registered.

In the private app storage 212A for Mr. A, the private apps of "copy in black/white" and "two copies" are stored, but the private app of "send to Mr. C" is not stored. However, the public app of "send to Mr. C" stored in the public app storage 211 may be registered in the screen management table 216A for Mr. A so that a corresponding icon 101c may be displayed on a menu screen 100a illustrated in FIG. 6A to be described later, and the public app of "send to Mr. C" may be used.

FIG. 5B is a view illustrating an example of the screen management table 216B for Mr. B. The screen management table 216B is used for managing a screen displayed on the operation display 22 when Mr. B logs in. Similarly to FIG. 5A, the screen management table 216B includes items such as a "management ID," an "app name," a "private UID," a "public UID," and a "control ID." It is assumed that in the "app name" described in FIG. 5B, for example, "send to Mr. A," "two copies," and "send to Mr. C in color" are registered. The app name "send to Mr. C in color" indicates a private app that is created by duplicating the public app of "send to Mr. C" and changing setting values, but is given the same public UID as that of the original "send to Mr. C" and managed. Then, when the public app of "send to Mr. C" is deleted, not only the private app of "send to Mr. C," but also the private app of "send to Mr. C in color" whose app name is changed by changing setting values after copy may also be deleted.

In the private app storage 212B for Mr. B, the private apps of "send to Mr. A" and "send to Mr. C in color" are stored, but the private app of "two copies" is not stored. However, the public app of "two copies" stored in the public app storage 211 may be registered in the screen management table 216B for Mr. B so that a corresponding icon 101b may be displayed on a menu screen 100b illustrated in FIG. 6B to be described herein below, and the public app of "two copies" may be used.

Configuration of Menu Screen

Figure 6A:
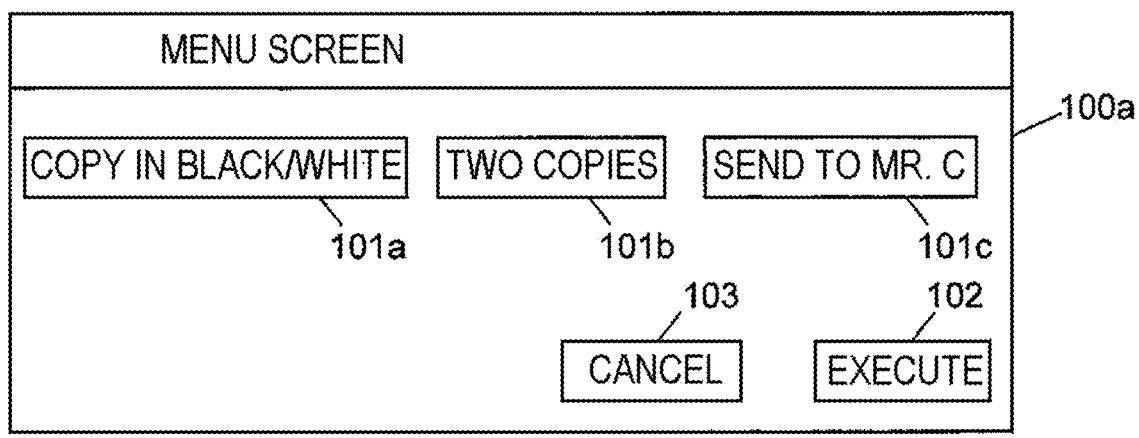
FIG. 6A is a view illustrating an example of a menu screen displayed for Mr. A.
Figure 6B:
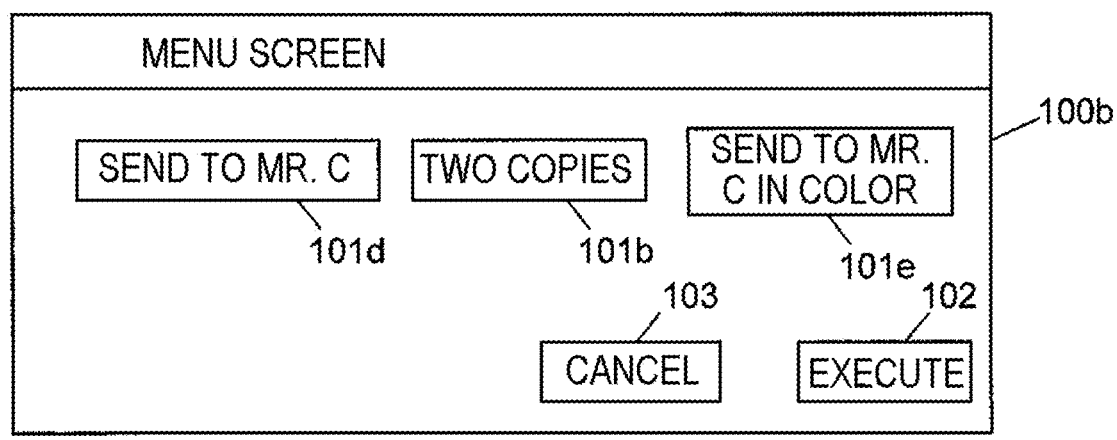
FIG. 6B is a view illustrating an example of a menu screen displayed for Mr. B.

FIG. 6A is a view illustrating an example of a menu screen displayed on the operation display 22 when Mr. A logs in, and FIG. 6B is a view illustrating an example of a menu screen displayed on the operation display 22 when Mr. B logs in.

When Mr. A logs in, the menu screen 100a displayed on the operation display 22 is controlled by the display controller 204 based on the screen management table 216A for Mr. A. When Mr. A logs in, the menu screen 100a includes, for example, respective icons 101a, 101b, and 101c of "copy in black/white," "two copies," and "send to Mr. C," an "execute" button 102 by which an application corresponding to the selected icon 101a to 101c is executed, and a "cancel" button 103 that cancels selection of the icon 101a to 101c, as illustrated in FIG. 6A.

As illustrated in FIG. 5A, nothing is set to the control ID of "send to Mr. C." Thus, when an administrator deletes the public app of "send to Mr. C" from the public app storage 211, the icon 101c of "send to Mr. C" is deleted from the menu screen 100a. "Copy in black/white" is set with the control ID "CON4," and thus as illustrated in FIG. 2, Mr. A may use the private app of "copy in black/white" until 2018/3/31. That is, the icon 101a of "copy in black/white" is deleted from the menu screen 100a after 2018/3/31.

When Mr. B logs in, the menu screen 100b displayed on the operation display 22 is controlled by the display controller 204 based on the screen management table 216B for Mr. B. When Mr. B logs in, the menu screen 100b includes, for example, respective icons 101d, 101b, and 101e of "send to Mr. A," "two copies," and "send to Mr. C in color," an "execute" button 102 by which an application corresponding to the selected icon 101b, 101d, or 101e is executed, and a "cancel" button 103 that cancels selection of the icon 101b, 101d, or 101e, as illustrated in FIG. 6B. The "execute" button 102, and the "cancel" button 103 may not be provided.

As illustrated in FIG. 5B, "two copies" is not a copied one, and thus, nothing is set to the control ID related to the public UID "PPP1." Then, even when an administrator deletes the public app of "two copies" from the public app storage 211, the icon 101b of "two copies" does not disappear from the menu screen 100b. Also, even when Mr. B operates the icon 101b of "two copies," the icon 101b is not operated because there is no entity. The public app "send to Mr. C in color" is set with the control ID "CON3," and thus, as illustrated in FIG. 2, Mr. B may use the private app of "send to Mr. C in color" until 2018/12/1. That is, the icon 101e of "send to Mr. C in color" is deleted from the menu screen 100b after 2018/12/1.

When a control ID set for a public app and a control ID set for a private app conflict with each other, either one, for example, the control ID set for the private app, may be prioritized. Otherwise, either one may be deleted when used first. For example, when "use three times" is set for a public app, and "use once" is set for a private app, in the case of one use, "use once" for the private app is run and deleted. When a control ID is not set for a public app, and a control ID is set for a private app, the control ID set for the private app may function. When a control ID is not set for a private app, and a control ID is set for a public app, the control ID set for the public app may function.

Hereinafter, respective units 200 to 205 of the controller 20 will be described.

The receiving unit 200 accepts an operation on the operation display 22 by an administrator or a user. When the administrator or the user inputs a user ID by operating the operation display 22, the receiving unit 200 recognizes who has performed the operation based on the input user ID.

The first creating unit 201 creates a public application based on the operation on the operation display 22 by the administrator.

The second creating unit 202 creates a private application based on the operation on the operation display 22 by the administrator or the user.

When a public application is deleted from the public app storage 211, the deleting unit 203 deletes a corresponding private application from the private app storage 212 according to predetermined conditions.

The conditions include, for example, the following:
(1) the number of times a private app is usable or a period during which the private app is usable
(2) when either the number of times or the period in (1) is reached first.

A condition may be determined for each user, or each private app. For the condition, validation or invalidation may be set for each user or each private app. The condition may fail to start being used when the condition is invalidated.

The deleting unit 203 may invalidate the function of an icon that instructs a private application to run on a display screen displayed to a corresponding user without deleting the private application stored in the private app storage 212. In this case, the icon in which the function is invalidated may be hidden.

The display controller 204 performs a control such that a screen according to a user is displayed on the operation display 22, based on the screen management table 216.

The execution unit 205 executes, with respect to a selected application, a processing specified by setting values held in the application by controlling, for example, the image reading unit 23, the image forming unit 24, and the communication unit 25.

Operation of Exemplary Embodiment

Hereinafter, an example of an operation of the image forming apparatus 1 will be described.

(1) Creation of Public Application

Figure 7:
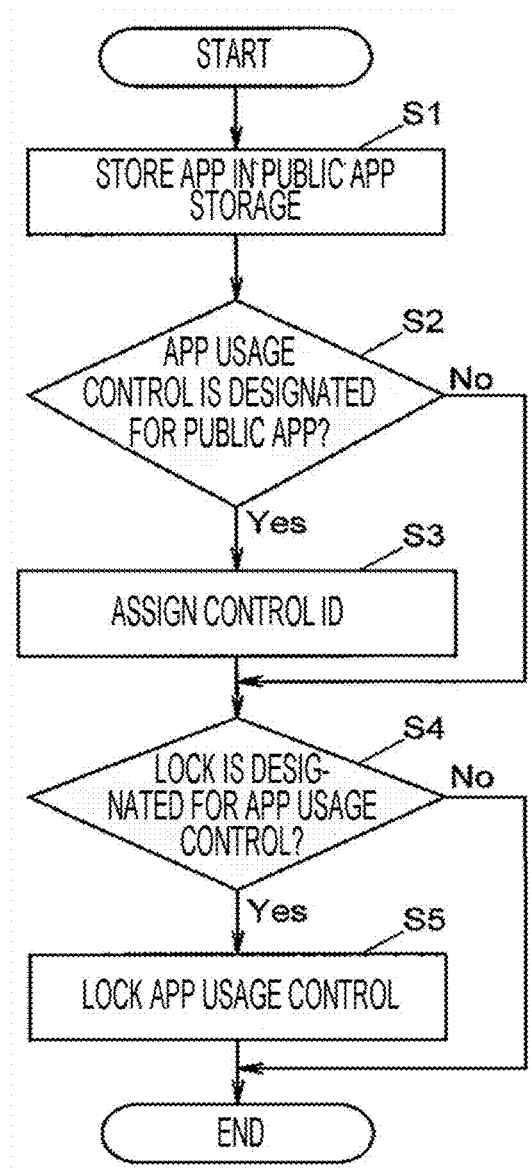
FIG. 7 is a flowchart illustrating an example of a creation flow of a public application.

FIG. 7 is a flowchart illustrating an example of a creation flow of a public application.

The receiving unit 200 receives a user ID and a password through an operation on the operation display 22 by an administrator (e.g., Mr. Z). When the received user ID and password are authenticated as belonging to the administrator by the controller 20, the receiving unit 200 receives setting items required for creating a public app and values of the corresponding setting items (setting values) through an operation on the operation display 22 by the administrator. The first creating unit 201 creates the public app based on the setting items and the setting values received by the receiving unit 200, and stores the public app in the public app storage 211 (S1). The first creating unit 201 assigns a UID to the created public app, and registers the UID together with an app name in the public app management table 214 illustrated in FIG. 3. The app name is given from the administrator through an operation on the operation display 22.

The receiving unit 200 determines whether an app usage control has been designated for the created public app (S2). Designating an app usage control for the public app is performed by inputting a corresponding control ID to the operation display 22 by the administrator.

When it is determined that the app usage control has been designated (S2 "Yes"), the receiving unit 200 assigns the input control ID to the public app (S3). That is, the control ID is registered in the public app management table 214 illustrated in FIG. 3. Here, when the app usage control is a new one, the control ID is also registered in the app use control table 213 illustrated in FIG. 2.

Next, the receiving unit 200 determines whether a lock has been designated for the app usage control (S4). When it is determined that the lock has been designated for the app usage control (S4 "Yes"), the receiving unit 200 gives a square bracket to the control ID of the public app management table 214 to lock the app usage control (S5). In a case where the lock of the app usage control is designated, the administrator inputs information indicating the lock as well when inputting the corresponding control ID to the operation display 22.

(2) Copy of Public Application

Figure 8:
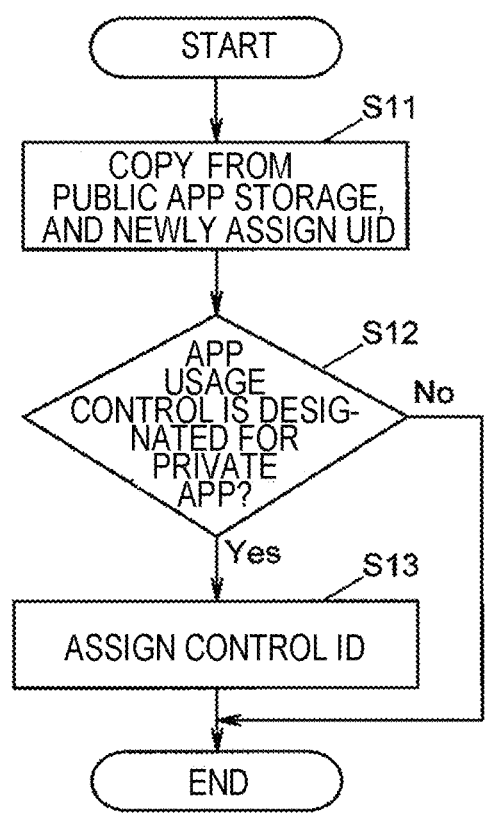
FIG. 8 is a flowchart illustrating an example of a copy flow of a public application.

FIG. 8 is a flowchart illustrating an example of a copy flow of a public application; Hereinafter, descriptions will be made on a case where a user performs a copy operation.

The receiving unit 200 receives a user ID and a password through an operation on the operation display 22 by a user (e.g., Mr. A). When the received user ID and password are authenticated as belonging to Mr. A by the controller 20, the receiving unit 200 receives selection of a public app as a copy target among public apps stored in the public app storage 211 through an operation on the operation display 22 by Mr. A. The second creating unit 202 copies the public app to create a private app, and stores the private app in the private app storage 212A for Mr. A. Then, the second creating unit 202 newly generates a private UID and registers the private UID in the private app management table 215A for Mr. A (S11).

The receiving unit 200 determines whether designation of an app usage control for the copied private app has been received (S12).

When it is determined that the designation of the app usage control has been received (S12 "Yes"), a control ID corresponding to the received app usage control is given to the private app (S13). Here, when the app usage control is a new one, the control ID is registered in the app use control table 213 illustrated in FIG. 2.

(3) Deletion of Public Application

Figure 9:
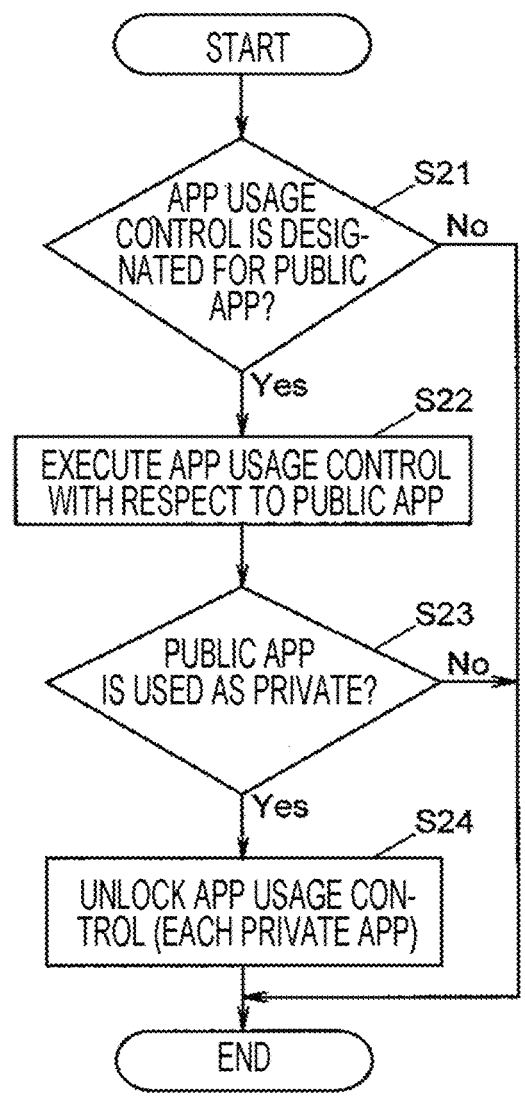
FIG. 9 is a flowchart illustrating an example of a deletion flow of a public application.

FIG. 9 is a flowchart illustrating an example of a deletion flow of a public application.

The receiving unit 200 receives a public app as a deletion target from an administrator after the authentication as described above. The deleting unit 203 determines whether an app usage control has been designated for the public app as the deletion target with reference to the public app management table 214 (S21).

When it is determined that the app usage control is designated (S21: "Yes"), the deleting unit 203 executes the app usage control (S22).

The deleting unit 203 determines whether the public app is copied as a private app with reference to the public app management table 214 and the private app management table 215 (S23).

When it is determined that the public app is copied as a private app (S23 "Yes"), the app usage control is unlocked with respect to each private app (S24).

(4) Use of Private Application of Each User

Figure 10:
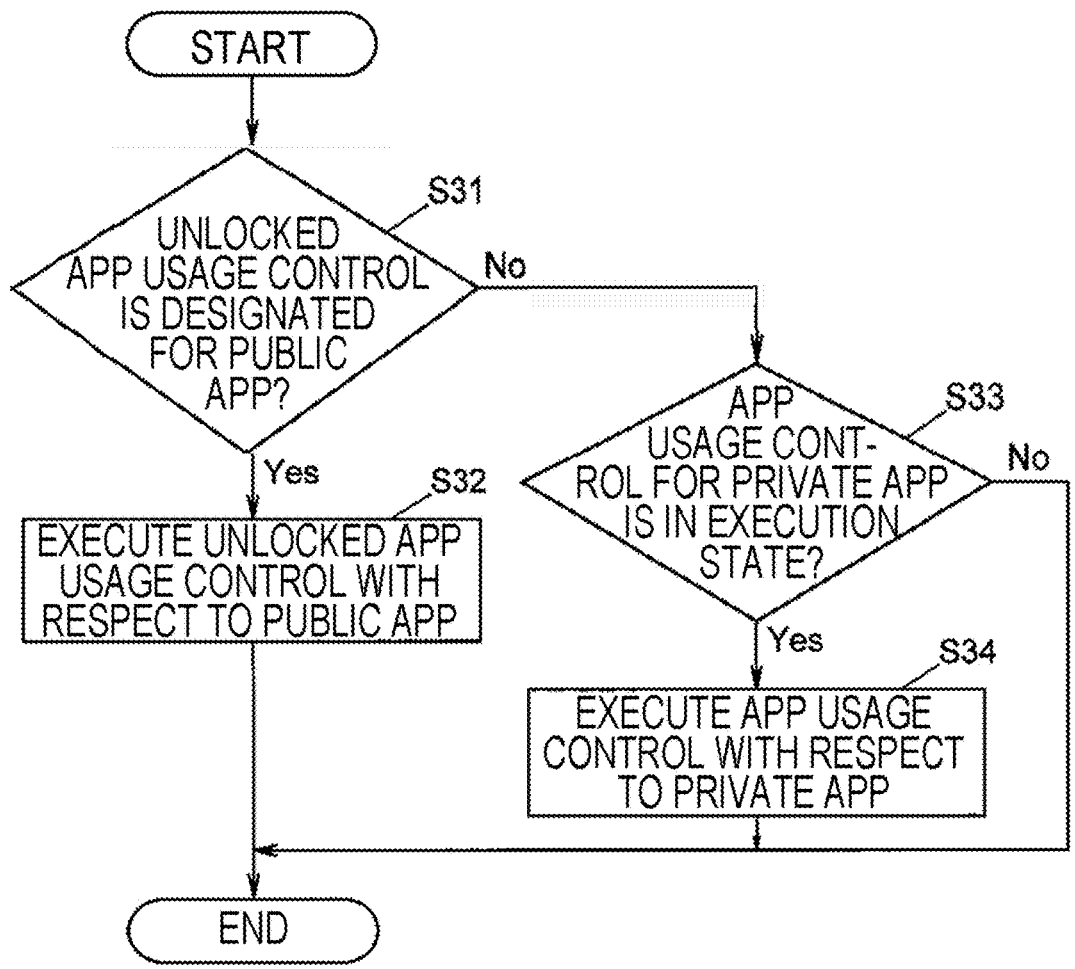
FIG. 10 is a flowchart illustrating an example of a use flow of a private application of each user.

FIG. 10 is a flowchart illustrating an example of a use flow of a private application of each user.

The execution unit 205 determines whether an unlocked app usage control has been designated for a public app, with reference to the private app management table 215 (S31).

When it is determined that the app usage control has been designated (S31 "Yes"), the unlocked app usage control for the public app is executed (S32).

In step S31, when it is determined that the app usage control has not been designated (S31 "No"), it is determined whether an app usage control for a private app is placed in an execution state (S33).

When it is determined that the app usage control for the private app is placed in the execution state (S33 "Yes"), the app usage control is executed for the private app (S34).

First Modification

FIGS. 11A to 11C are views illustrating an example of an icon displayed on a display screen of the operation display 22 in the first modification. When a public app is copied and a private app is created, an icon that activates the private app is created, and is displayed on the display screen of the operation display 22. In this case, the icon that activates the private app may be displayed in a different manner so as to be distinguishable from an icon that activates the corresponding public app. For example, as illustrated in FIG. 11A, with respect to an icon 10 that activates the public app, an icon 11 that activates the private app may be displayed in a different color from the icon 10. As illustrated in FIG. 11B, a control badge 12 may be added to the icon 11. As illustrated in FIG. 11C, in order to indicate that the icon 11 is placed in a usable state (active state), "ON" may be added to an app name.

Second Modification

FIGS. 12A and 12B illustrate another example of the app use control table 213 in a second modification. FIG. 12A is a view illustrating an example of an app use control table 213a, and FIG. 12B is a view illustrating an example of a permission table.

As in FIG. 2, the app use control table 213a illustrated in FIG. 12A includes items of a "control ID," a "usage condition," and a "registrant."

A permission table 213b illustrated in FIG. 12B includes items such as a "management ID" that indicates a management number in the corresponding table 213b, and a "permitted user" in which a permitted user name is registered.

The conditions may include contents that permit a specific user to make unlimited use. That is, when an app usage control of "CON10" is executed (unlocked), since the usage condition is "available if registered in a permission table," for Mr. A, who is not registered in the permission table 213b, a use is not permitted, and a private app is deleted from the private app storage 212A for Mr. A. Meanwhile, for Mr. B, who is registered in the permission table 213b, a use is permitted, and a private app is not deleted from the private app storage 212B for Mr. B. When an app usage control of "CON11" is executed (unlocked), since the usage condition is "available for Mr. A and Mr. B," although not registered in the permission table 213b, Mr. A and Mr. B are allowed to use the app. By performing designation in this manner, it is possible to narrow down the number of users permitted to perform copy.

Third Modification

FIG. 13 is a view illustrating another example of the app use control table 213 in a third modification. The app use control table 213c illustrated in the drawing includes items such as a "control ID," a "usage condition," and a "registrant" as in FIG. 2.

The conditions may include contents of an operation at the time of deletion. That is, the operation contents may include displaying a warning or displaying a screen for confirming continued use to enable the continued use. Specifically, as in "CON20," the usage condition may be "use while stored in the public app storage, and warn each user about 'deleted'," or as in "CON21," the usage condition may be "use while stored in the public app storage, and display 'continue to use?' to allow each user to select a subsequent use."

Fourth Modification

FIGS. 14A to 14D are views for explaining another example of the public app management table 214 in a fourth modification. As illustrated in FIG. 14A, when the contents of the management ID"3" in the screen management table 216B for Mr. B in FIG. 5B are registered in the public app management table 214 in FIG. 3 and developed as a public app, as illustrated in FIG. 14B, it is required to further designate a control ID that belongs to XXX. Here, since an app usage control assigned to an app stored in the private app storage 212B for Mr. B needs to be maintained, the public app management table 214 needs to be set as illustrated in FIG. 14C. When a UID PPP3 is deleted, an app usage control of PPP2 and an app usage control of PPP3 are checked. FIG. 14C indicates that the UID PPP3 refers to a public UID PPP2, and when a control ID of PPP2 is changed, PPP3 is automatically affected as well. In the case of FIG. 14C, control IDs [CON2], CON5, and CON3 are assigned to the UID PPP3.

For the case where this has been copied, as illustrated in FIG. 14D, it is desirable to have plural public UIDs.

As described above, an exemplary embodiment of the present disclosure has been described. However, an exemplary embodiment of the present disclosure is not limited to the above-described exemplary embodiment, and may be modified and implemented in various ways within the scope in which the gist of the present disclosure is not changed. For example, in the above exemplary embodiment, applications are stored in the storage 21 of the image forming apparatus 1, but may be stored in an external server such as a cloud server. In the above exemplary embodiment, an application holds setting values, but the application may refer to the setting values.

Each part or all of the respective units of the controller 20 may be constituted by hardware circuits such as a reconfigurable circuit (FPGA: field programmable gate array) and an application specific integrated circuit (ASIC).

Within the scope in which the gist of the present disclosure is not changed, a part of constituent elements of the above exemplary embodiment may be omitted or changed. Within the scope in which the gist of the present disclosure is not changed, in the flow of the above exemplary embodiment, it is possible to perform, for example, addition, deletion, modification, or change of a step. A program used in the above exemplary embodiment may be provided while recorded in a computer-readable recording medium such as a CD-ROM. A program used in the above exemplary embodiment may be stored in an external server such as a cloud server, and then, used via a network.

Summary of Exemplary Embodiment

An information processing apparatus according to a further exemplary embodiment of the present disclosure includes: a creating unit that creates, from a first application capable of executing a processing specified by a setting value of registered setting items, a second application for each user in such a manner that the second application is usable only by the user; a first receiving unit that receives, for each setting item for the first application, designation of a type related to whether to change a setting value of the second application; a second receiving unit that receives change of a setting value for the second application; and a changing unit that changes, according to the type, a setting value received by the second receiving unit.

The first application and the second application execute processings specified according to setting values of registered setting items. As the first application and the second application, for example, some applications are immediately executed without displaying of a screen for confirming setting values, and other applications are executed after a screen for confirming setting values is displayed and confirmed.

The information processing apparatus may be, for example, an image forming apparatus such as a multifunction machine or a facsimile device, a multifunctional mobile phone (smart phone), a personal computer (PC), or a tablet terminal.

Exemplary Embodiment

Figure 15:
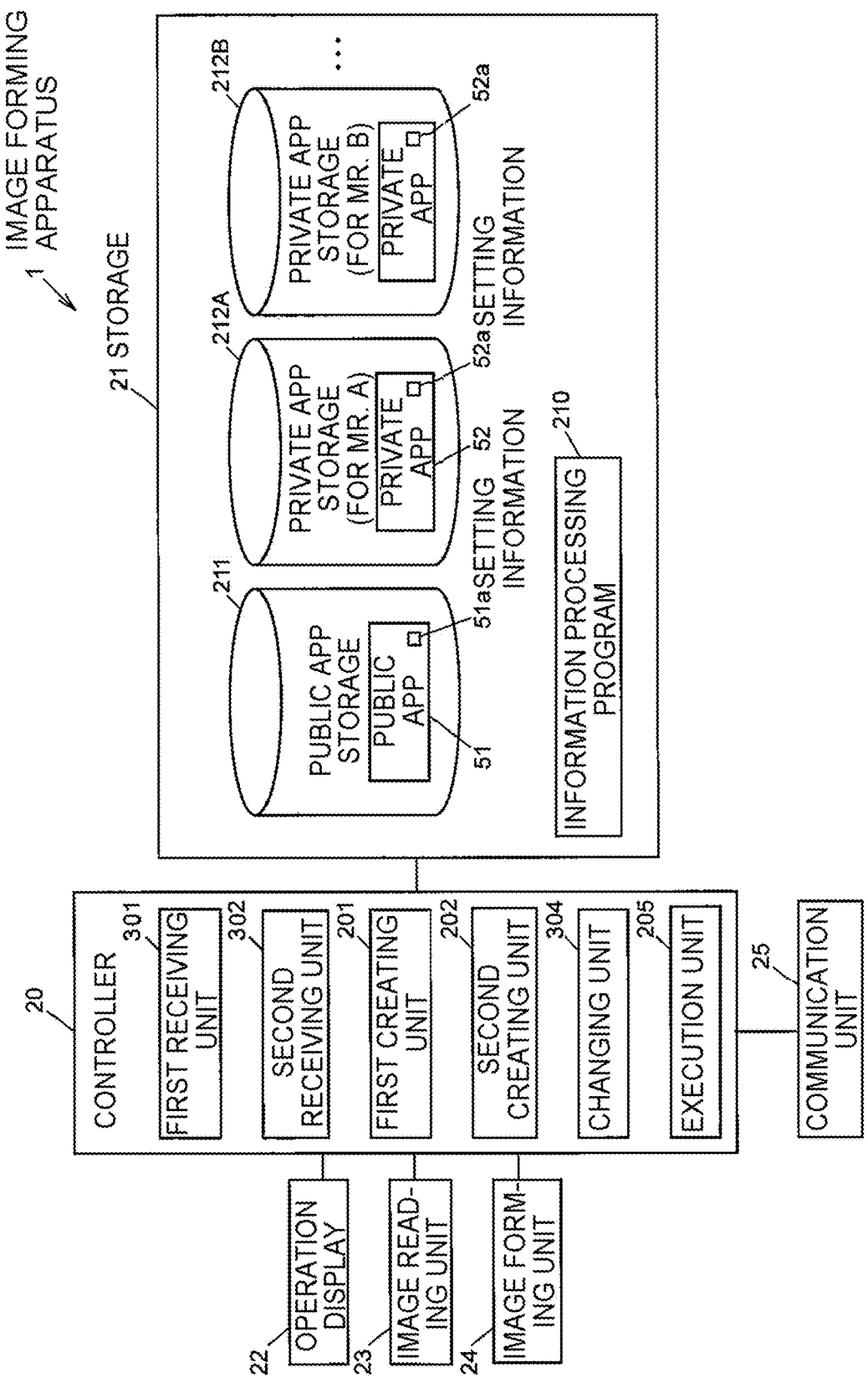
FIG. 15 is a block diagram illustrating an example of a control system of an image forming apparatus according to an exemplary embodiment of the present disclosure.

FIG. 15 is a block diagram illustrating an example of a control system of an image forming apparatus according to another exemplary embodiment of the present disclosure. The image forming apparatus 1 is a multifunction machine having plural functions such as, for example, scanning, printing, copying, e-mailing, or facsimiling. The image forming apparatus 1 includes a controller 20, a storage 21, an operation display 22, an image reading unit 23, an image forming unit 24, and a communication unit 25. The multi-function machine is an example of an information processing apparatus.

The controller 20 is constituted by, for example, a central processing unit (CPU) and an interface. The CPU operates in accordance with an information processing program 210 to function as a first receiving unit 301, a second receiving unit 302, a first creating unit 201, a second creating unit 202, a changing unit 304, or an execution unit 205. Details of each of the units 301 to 205 will be described below.

The storage 21 is constituted by a read only memory (ROM), a random access memory (RAM), or a hard disk, and stores various types of information including the information processing program 210, a public app storage 211, and private app storages 212A and 212B, . . . (hereinafter, these may be collectively referred to as the "private app storage 212") provided for each user. In FIG. 15, it is assumed that the private app storage 212A is prepared for Mr. A as a user, and the private app storage 212B is prepared for Mr. B as a user. The user is an example of a user excluding an administrator. Hereinafter, when both the administrator and the user are included, the administrator and the user are also called operators.

The public app storage 211 stores a public application (hereinafter, also simply referred to as a "public app") 51. The public application 51 is an example of a first application.

The private app storage 212 stores a private application (hereinafter, also simply referred to as a "private app") 52. The private application 52 is an example of a second application. Hereinafter, the public app 51 and the private app 52 may be collectively simply referred to as "applications."

The public application 51 is an application published by a creator (hereinafter, referred to as an "administrator") of the application, and only the administrator has an authority to change setting values. The private application 52 is an application obtained by duplicating the public application by an administrator or a user, which is not open to others than the corresponding user. Only the corresponding user has an authority to change setting values. In the present specification, "copy" indicates that the private application 52 is created while setting values held in the public application 51 are kept as they are.

An application of the exemplary embodiment holds setting information including, for example, setting items and setting values in advance. For example, as applications, some applications may be immediately executed by a direct activation mode, in which a screen for confirming setting values is not displayed. Other applications may be executed after a screen for confirming setting values is displayed and confirmed. Such applications include, for example, "two copies," "send to Mr. A," and "send to Mr. C in color." The application "two copies" is an application by which two copies of a document with one or more pages are made. The app name "send to Mr. A" indicates an application by which an image is sent to a user terminal device of Mr. A via an e-mail. The app name "send to Mr. C in color" indicates an application by which a color image is sent to a user terminal device of Mr. C via an e-mail.

The operation display 22 has a touch panel display having a touch panel superimposed on a display portion such as a liquid crystal display, which displays a screen such as a menu screen on the display portion, and accepts an operation from an operator to the touch panel. On the menu screen, for example, an icon including an app name such as "two copies" or "send to Mr. A" is displayed. When an icon is selected, the corresponding application starts to run. The icon refers to a representation that shows, with a picture, a pictogram, a letter, or the like, the function of processing executable by an application and instructs execution of the processing.

The image reading unit 23 includes an automatic document feeder provided on a document table, and a scanner that reads image data from a document placed on the document table, or a document fed by the automatic document feeder. The image reading unit 23 stores the read image data in the storage 21.

The image forming unit 24 forms a black-white image or a color image on a recording medium such as a sheet through, for example, an electrophotographic system or an inkjet method.

The communication unit 25 transmits and receives data to/from an external device such as an administrator terminal device used by an administrator and a user terminal device used by a user via a network, by an e-mail or a facsimile. The network is a communication network such as a local area network (LAN), the Internet, or a public network, which transmits and receives data through, for example, a wired communication or a wireless communication.

FIGS. 16A to 16C are views for explaining setting information held in applications. FIG. 16A is a view illustrating an example of setting information before setting values of the public app 51 are changed, FIG. 16B is a view illustrating an example of setting information after the setting values of the public app 51 are changed, and FIG. 16C is a view illustrating an example of setting information of the private app 52. Setting information 51a of the public app 51, as illustrated in FIGS. 16A and 16B, includes items such as "setting item" in which setting items are recorded, "setting value" in which setting values are rerecorded, and "type" in which the types of setting items are recorded. Setting information 52a of the private app 52, as illustrated in FIG. 16C, includes not only "setting item," "setting value," and "type" but also "scheduled changed value" in which a setting value changed and scheduled is recorded. Examples of the "type" include "changeable," "sustainably changeable," and "unchangeable" types. These "types" are non-limiting. For example, there may be only two types "changeable" and "unchangeable," or another type may be added to "changeable," "sustainably changeable," and "unchangeable."

Value setting may include "changeable setting" in which setting may be changed by user authority for the created private app and "unchangeable setting" in which setting may not be changed by user authority for the created private app and user authority of the public app serving as a basis is required.

Setting items included in the changeable setting may include, for example, "changeable" and "sustainably changeable." In the "changeable," a user may arbitrarily change a setting value of the private app 52, and in the "sustainably changeable," a user may keep a changed value of a setting value of the private app 52 by the user's intention.

Setting items included in the unchangeable setting may include, for example, "unchangeable" and "confirmation of whether to change." In the "unchangeable," a user may not change a setting value of the private app 52, and in the "confirmation of whether to change," when a user of the private app wants to change a setting value, it is checked whether a user of the public app allows a setting change. In the exemplary embodiment, a type of a confirmation of whether to change is not provided, but may be provided.

That is, the "sustainably changeable" is a setting item in which an administrator may change a setting value of the private app 52 when a user's consent is obtained. The "unchangeable" is a setting item in which an administrator may forcibly change a setting value of the private app 52.

It is assumed that an administrator has changed setting values a1, b1, and c1 of setting items A, B, and C in the public app illustrated in FIG. 16A, to setting values a2, b2, and c2, respectively, as illustrated in FIG. 16B. The changing unit 304 to be described below, as illustrated in FIG. 16C, writes setting values a2 and b2 in the items of "scheduled changed value," with the types of "sustainably changeable" and "unchangeable" in the private app 52.

Hereinafter, each of units 301 to 205 of the controller 20 will be described.

The first receiving unit 301 accepts an operation of an administrator on the operation display 22. Specifically, the first receiving unit 301 receives, from the administrator, for example, designation of the type of a setting item for each setting item, change of a setting value of the public app 51, and a scheduled changed value, which is a setting value of the private app 52 changed and scheduled. The type of the setting item relates to whether to change a setting value of the private app 52. The type of the setting item may include, for example, "changeable," "sustainably changeable," and "unchangeable." It is assumed that a setting item not designated with any type is designated with a type of "changeable," "sustainably changeable" or "unchangeable."

The second receiving unit 302 accepts an operation of a user on the operation display 22. Specifically, the second receiving unit 302 receives change of a setting value of the private app 52. In the case where the type of a setting item is not "changeable," when the private app 52 is selected, the second receiving unit 302 notifies the user of a scheduled changed value at the next use of the private app 52 by the corresponding user.

In the case where the type of a setting item is "sustainably changeable," when the private app 52 is selected, the second receiving unit 302 displays a screen for confirming whether to accept change of a scheduled changed value, on the operation display 22, even though the corresponding private app 52 is an application immediately executed without displaying of a screen for confirming setting contents.

The first creating unit 201 creates the public app 51 based on the operation by the administrator on the operation display 22 of the image forming apparatus 1. The first creating unit 201 also creates an icon corresponding to the public app in order to display the icon on the menu screen.

The second creating unit 202 creates the private app 52 for each user from the public app 51, based on the operation by the administrator or the user on the operation display 22 of the image forming apparatus 1. The second creating unit 202 copies setting values of the public app 51 at the time of creation of the private app 52, and newly stores the setting values. The second creating unit 202 also creates an icon corresponding to the private app 52 in order to display the icon on the menu screen.

The changing unit 304 changes the setting value received by the second receiving unit 302 according to the type of the setting item. In the case where the type of the setting item is "unchangeable" or "sustainably changeable," and the change of the scheduled changed value is accepted by the user, when the private app 52 is selected, the changing unit 304 changes the setting value to the scheduled changed value.

The execution unit 205 executes, with respect to a selected application, a processing specified by setting values held in the application by controlling, for example, the image reading unit 23, the image forming unit 24, and the communication unit 25.

Operation of Exemplary Embodiment

Hereinafter, an example of an operation of the image forming apparatus 1 will be described.

(1) Creation of Public App and Private App

Figure 17:
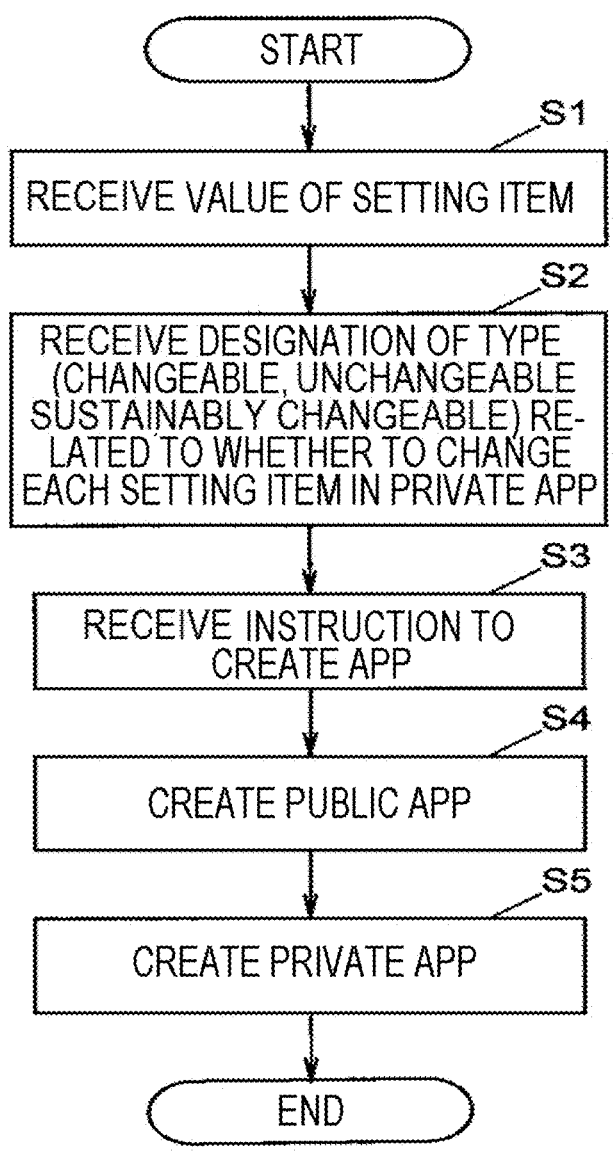
FIG. 17 is a flowchart illustrating an example of a creation flow of a public app and a private app.

FIG. 17 is a flowchart illustrating an example of a creation flow of a public app and a private app.

An administrator operates the operation display 22 of the image forming apparatus 1 to input his user ID and password. After the authentication, the administrator operates the operation display 22 to designate setting items required for creating a public app and values of the corresponding setting items (setting values). The first receiving unit 301 receives the designated setting items and setting values (S1).

The administrator operates the operation display 22 to designate a type related to whether to change a setting value in the private app 52, with respect to each of the setting items. The first receiving unit 301 receives the designated type for each of the setting items (S2).

When the first receiving unit 301 receives an instruction to create an app from the administrator (S3), the first creating unit 201 creates the public app 51 that holds the setting information 51a including the setting items, the setting values and the types received by the first receiving unit 301 (S4). The first creating unit 201 stores the created public app 51 in the public app storage 211.

Next, through an operation of the administrator or the user, the second creating unit 202 copies the public app 51 stored in the public app storage 211 to create the private app 52 for each user. The second creating unit 202 stores the created private app 52 in each private app storage 212. Accordingly, each user may access his private app storage 212 and use the private app 52. In this step, each of the setting values in each private app 52 is the same as that in the public app 51.

(2) Change of Setting Value of Setting Item in Private App

Figure 18:
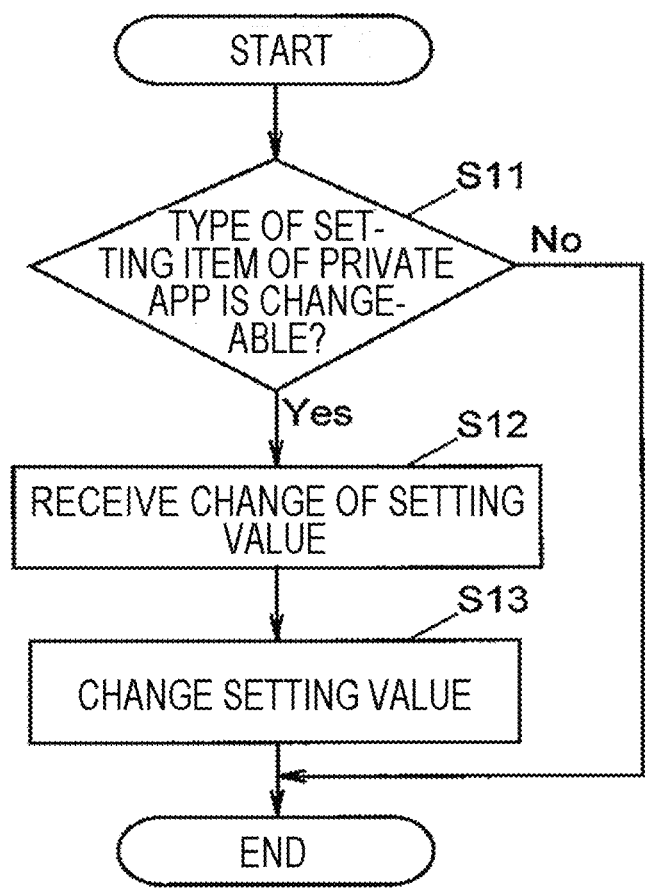
FIG. 18 is a flowchart illustrating an example of flow of change of a setting value of the private app.

FIG. 18 is a flowchart illustrating an example of flow of change of a setting value of the private app.

The user operates the operation display 22 to designate a setting item having a setting value he wants to change, among setting items set for the private app 52. The second receiving unit 302 receives the designated setting item, and determines whether the type of the setting item is "changeable" with reference to the setting information 52a of the private app 52 (S11).

When it is determined that the type is "changeable" (S11 "Yes"), the second receiving unit 302 receives change of the setting value by the user (S12). The changing unit 304 rewrites and replaces the setting value held by the private app 52 with the received setting value (S13).

In step S11, when it is determined that the type of the designated setting item is not "changeable" (S11 "No"), the processing ends.

(3) Change of Setting Value of Public App

Figure 19:
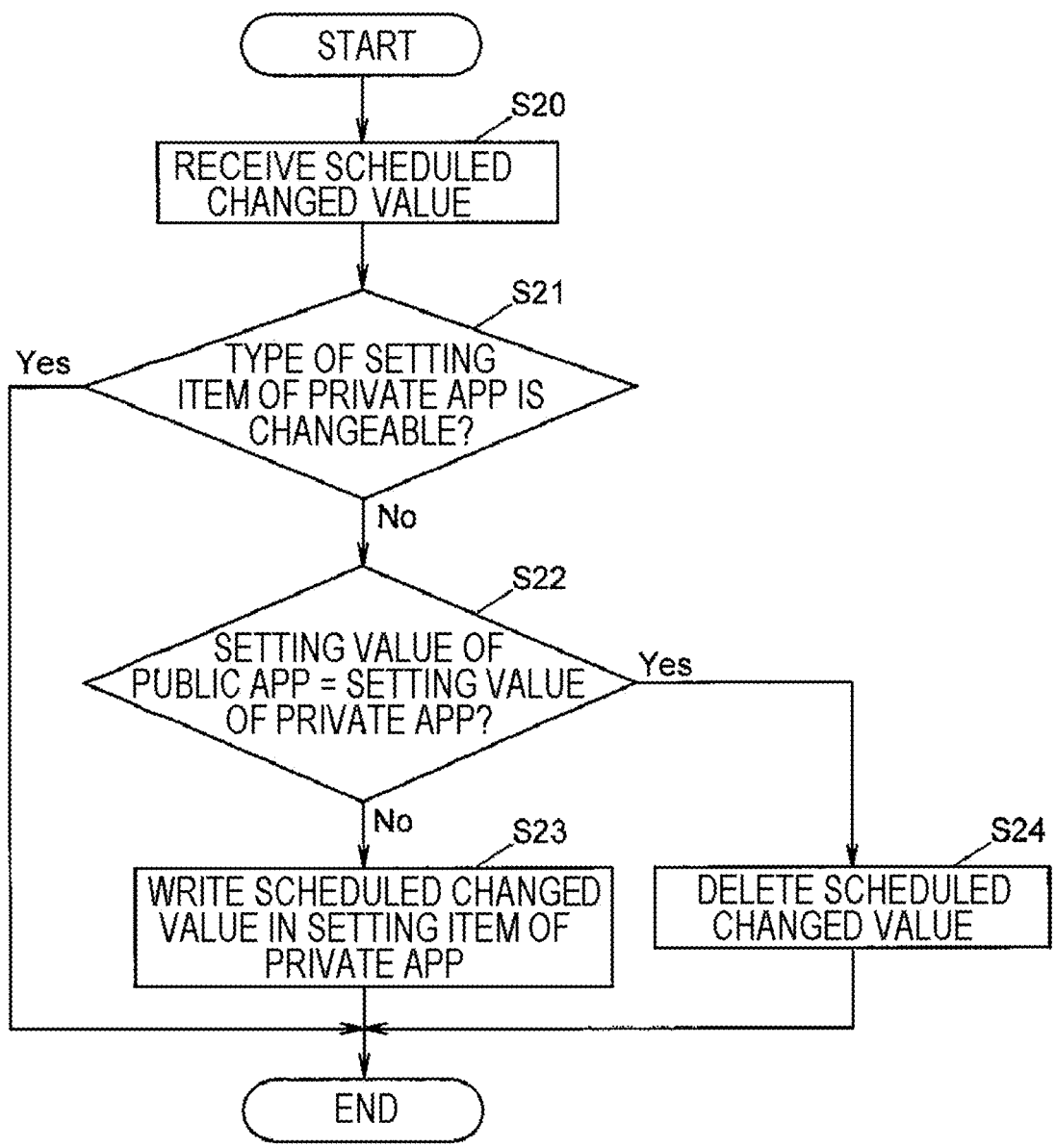
FIG. 19 is a flowchart illustrating an example of a flow of change of a setting value of the public app.

FIG. 19 is a flowchart illustrating an example of a flow of change of a setting value of the public app.

The administrator operates the operation display 22 of the image forming apparatus 1 to input his user ID and password. After the authentication, the administrator operates the operation display 22 to designate a setting item and input a changed setting value. The first receiving unit 301 receives the input setting value, and the changing unit 304 rewrites the setting value of the public app 51, with the received setting value. The changing unit 304 records the setting value changed in the public app 51, in the "scheduled changed value" of the private app 52 (S20).

The changing unit 304 determines whether the type of the setting item for which the scheduled changed value is recorded is "changeable," with reference to the setting information 52a of the private app 52 (S21).

When it is determined that the type is "changeable" (S21 "Yes"), the processing ends.

When it is determined that the type is not "changeable," that is, "unchangeable" or "sustainably changeable" (S21 "No"), the changing unit 304 determines whether the setting value of the public app 51 is the same as the setting value of the private app 52 with respect to the corresponding setting item (S22).

When it is determined that both are not the same (S22 "No"), the setting value of the public app 51 is recorded in the "scheduled changed value" of the private app 52 (S23). For example, it is assumed that the public app (for example, an app name "send to Mr. A") 51 by which an image is sent to a user terminal device of Mr. A is created. In this case, since there is a possibility that a mail address of Mr. A may be changed, the type is set as "unchangeable." When the mail address of Mr. A is changed, by inputting the changed mail address, it is possible to write the changed mail address in the public app 51 of "send to Mr. A," as the scheduled changed value.

When it is determined that both are the same (S22 "Yes"), the scheduled changed value is deleted from the setting information 52a of the private app 52 (S24).

(4) At Activation of private app after setting value of public app is changed

Figure 20:
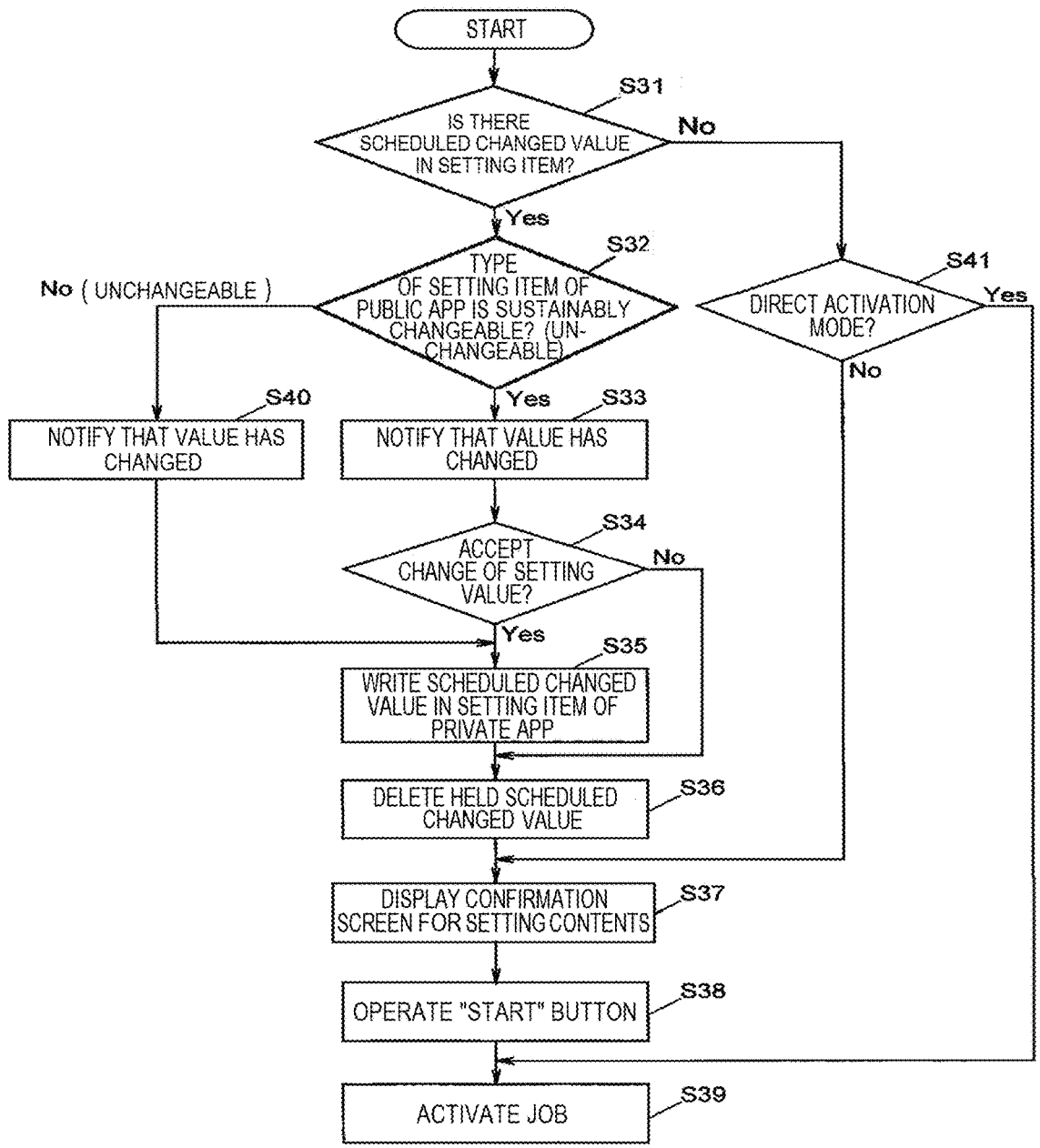
FIG. 20 is a flowchart illustrating an example of a flow at the time of activation of the private app after a setting value of the public app is changed.

FIG. 20 is a flowchart illustrating an example of a flow at the time of activation of the private app after a setting value of the public app is changed.

The user selects an icon from the menu screen by operating the operation display 22, and activates the private app 52 stored in the private app storage 212 allocated to the user himself/herself. Then, the changing unit 304 determines whether there is a setting item having a setting value recorded in the "scheduled changed value," with reference to the setting information 52a of the private app 52 (S31). When it is determined that the scheduled changed value is recorded (S31 "Yes"), the changing unit 304 determines whether the type of the corresponding setting item is "sustainably changeable" (S32).

When it is determined that the type of the setting item is "sustainably changeable" (S32 "Yes"), the fact that the setting value has changed is notified to the user (S33).

In the private app 52, a confirmation screen as to whether to accept change of the setting value is displayed on the operation display 22 so that the user performs confirmation (S34). When the user expresses an intention to accept the change of the setting value, for example, when the user operates a "YES" button on the confirmation screen (S34 "Yes"), the changing unit 304 rewrites the setting value of the private app 52 with the value of the "scheduled changed value" (S35). Instead of the "YES" button on the confirmation screen, an input of voice, for example, "Yes" may be used. Alternatively, an operation on a smartphone or an operation of putting hands over may be used.

The changing unit 304 deletes the value of the "scheduled changed value" (S36).

The changing unit 304 displays the confirmation screen of setting contents including setting items and setting values on the operation display 22 (S37).

When the user operates a "start" button on the confirmation screen (S38), the execution unit 205 activates the private app 52 (S39). Accordingly, the job is activated.

In step S32, when it is determined that the type of the setting item is "unchangeable" (S32 "No"), the fact that the setting value has changed is notified to the user (S40).

Thereafter, as described above, the processings in steps S35 to S39 are performed.

In step S31, when it is determined that the scheduled changed value is not recorded in the setting item (S31 "No"), it is determined whether a mode is a direct activation mode (S41). When it is determined that the mode is a direct activation mode (S41 "Yes"), the job is activated (S39).

When it is determined that the mode is not a direct activation mode (S41 "No"), the job is activated (S39) through display of the confirmation screen (S37) and an operation of the "start" button (S38).

First Modification

In a case where there exists a third private app created from a second private app, and the second and third private apps are created by the same creator, when the third private app is selected under a circumstance where setting values of the second private app were not changed at the time when the second private app was selected, the second receiving unit 302 may be configured not to display the screen for the confirmation.

Second Modification

In a case where there exists a third private app created from a second private app, and the second and third private apps are created by different creators, when the third private app is selected under a circumstance where setting values of the second private app were not changed at the time when the second private app was selected, the second receiving unit 302 may display the screen for the confirmation such that the setting values are changeable.

As described above, an exemplary embodiment of the present disclosure has been described. However, an exemplary embodiment of the present disclosure is not limited to the above-described exemplary embodiment, and may be modified and implemented in various ways within the scope in which the gist of the present disclosure is not changed. For example, in the above exemplary embodiment, a public app and a private app are stored in the storage 21 within the image forming apparatus 1, but may be stored in an external server such as a cloud server. In the above exemplary embodiment, an application holds setting values, but the application may refer to the setting values.

The applications used in the above exemplary embodiment hold setting information, but may refer to setting values, types, and scheduled changed values.

Each part or all of the respective units of the controller 20 may be constituted by hardware circuits such as a reconfigurable circuit (FPGA: field programmable gate array) and an application specific integrated circuit (ASIC).

Within the scope in which the gist of the present disclosure is not changed, a part of constituent elements of the above exemplary embodiment may be omitted or changed. Within the scope in which the gist of the present disclosure is not changed, in the flow of the above exemplary embodiment, it is possible to perform, for example, addition, deletion, modification, or change of a step. A program used in the above exemplary embodiment may be provided while recorded in a computer-readable recording medium such as a CD-ROM. A program used in the above exemplary embodiment may be stored in an external server such as a cloud server, and then, used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to function as:
a creating unit that creates, from a first application deletable by a person with a first authority, a second application deletable by a person with a second authority, the first application being a public application, the person with the first authority having an administrative authority, the second application being a private application usable by the person with the second authority, the person with the second authority having an authority different than the administrative authority; and
a deleting unit that deletes the second application according to a predetermined condition when the first application is deleted.

2. The information processing apparatus according to claim 1, wherein
the condition includes the number of times the second application is usable or a period during which the second application is usable.

3. The information processing apparatus according to claim 2, wherein
the condition includes a case where either of the number of times or the period is reached first.

4. The information processing apparatus according to claim 2, wherein
the condition allows validation or invalidation to be set for each person with the second authority or each second application, and
when the invalidation is set, the condition does not start being used.

5. The information processing apparatus according to claim 1, wherein
the condition is determined for each person with the second authority.

6. The information processing apparatus according to claim 5, wherein
the condition permits a specific person with the second authority to make unlimited use.

7. The information processing apparatus according to claim 1, wherein
the condition is determined for each second application.

8. The information processing apparatus according to claim 1, wherein
the condition includes contents of an operation for the deletion.

9. The information processing apparatus according to claim 8, wherein
the contents of the operation include displaying a warning or displaying a screen for confirming continued use to enable the continued use.

10. The information processing apparatus according to claim 1, wherein
the deleting unit deletes the second application from a storage area that stores the second application.

11. The information processing apparatus according to claim 1, wherein
without deleting the second application stored in a storage area, the deleting unit invalidates a function of an instruction unit that instructs the second application to run on a display screen displayed to the person with the second authority.

12. The information processing apparatus according to claim 11, wherein
the invalidated instruction unit is hidden.

13. The information processing apparatus according to claim 1, wherein
the creating unit copies setting values of the first application when the second application is created, and newly stores the setting values.

14. An information processing apparatus comprising:
a processor programmed to function as:

a creating unit that creates, from a first application capable of executing a processing specified by a setting value of registered setting items, a second application for each user in such a manner that the second application is usable only by the user, the first application being a public application, the first application being deletable by a person with an administrative authority, the second application being a private application usable by a person with the second authority, the person with the second authority having an authority different than the administrative authority;

a first receiving unit that receives, for each setting item for the first application, designation of a type related to whether to change a setting value of the second application;

a second receiving unit that receives change of a setting value for the second application; and a changing unit that changes, according to the type, a setting value received by the second receiving unit.

15. The information processing apparatus according to claim 14, wherein
when the type is not changeable and the second application is selected, the second receiving unit notifies the user of a scheduled changed value that is scheduled to be used for change of a setting value of the first application at next time when the user uses the second application.

16. The information processing apparatus according to claim 15, wherein
when the type is a sustainably changeable type and the second application is selected, the second receiving unit displays a screen for confirming whether to accept change of the scheduled changed value even if the second application is an application to be immediately executed without display of a screen for confirming setting contents.

17. The information processing apparatus according to claim 14, wherein
when the type is an unchangeable type and the second application is selected, the changing unit changes a setting value to a scheduled changed value.

18. The information processing apparatus according to claim 14, wherein
the first receiving unit receives designation of the type from a creator of the first application.

19. The information processing apparatus according to claim 18, wherein
the first receiving unit receives, from the creator of the first application, a scheduled changed value that is scheduled to be used for change of a setting value of the first application.

20. The information processing apparatus according to claim 19, wherein
the receiving unit records the scheduled changed value in the second application when setting values of the first and second applications are different from each other.

21. The information processing apparatus according to claim 14, wherein
when the second application is created, the creating unit copies a setting value of the first application and newly stores the setting value.

22. The information processing apparatus according to claim 14, wherein
the second receiving unit does not display a screen for confirmation when a third application created from the second application exists, the second and third applications are created by the same creator, and the third application is selected under a circumstance where no setting value is changed upon selection of the second application.

23. The information processing apparatus according to claim 14, wherein
the second receiving unit displays a screen for confirmation to enable change of a setting value when a third application created from the second application exists, the second and third applications are created by different creators, and the third application is selected.

\* \* \* \* \*